Aug. 10, 1943.  L. G. ZACHOS  2,326,111
INSTRUMENT FOR MEASURING LIQUIDS
Filed March 20, 1941
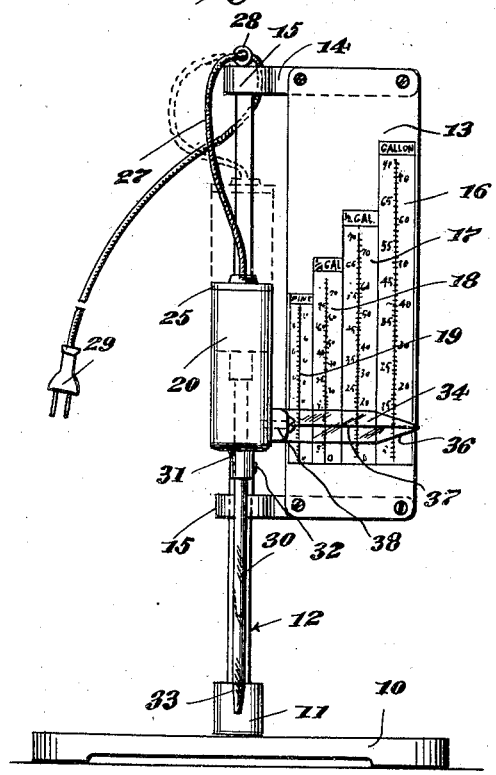
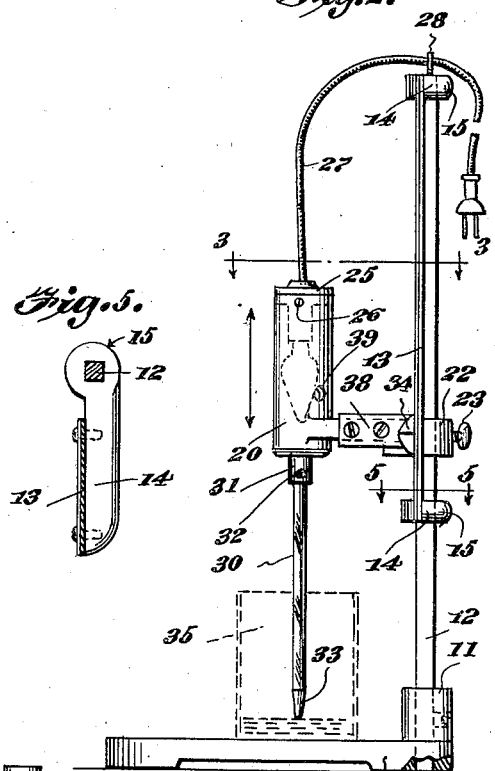
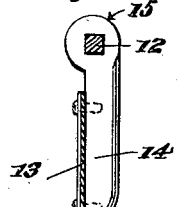
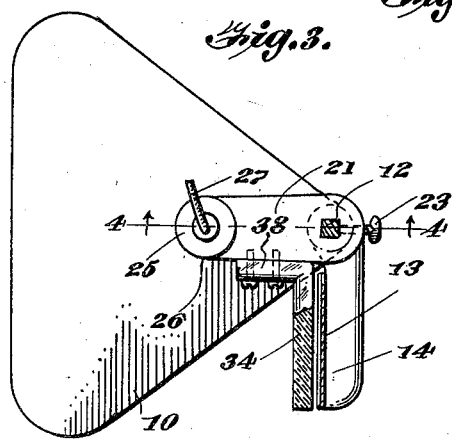
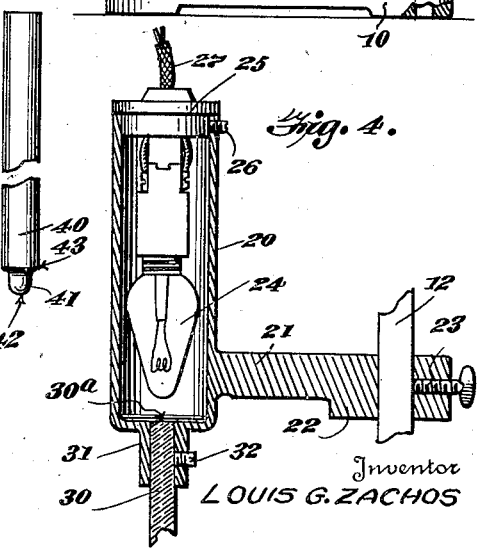
Inventor
LOUIS G. ZACHOS
By *Irving P. McCathran*
Attorney Patented Aug. 10, 1943

2,326,111

UNITED STATES PATENT OFFICE 2,326,111

INSTRUMENT FOR MEASURING LIQUIDS

Louis G. Zachos, Atlanta, Ga.

Application March 20, 1941, Serial No. 384,393

3 Claims. (Cl. 33—126.7)

This invention relates to an instrument for measuring liquids of any description, such as paint, lacquer, enamel, ink, and the like, and has for one of its objects the production of a simple and efficient instrument, the parts of which may be readily adjusted with a minimum of inconvenience to facilitate the placing of a predetermined amount of liquid within a receptacle with which the instrument is used.

A further object of this invention is the production of a simple and efficient means for adjustably mounting the indicator of the measuring instrument upon a supporting standard in a manner to facilitate the reading of the scale and also to determine the amount of liquid within a container which is being measured.

Other objects and advantages of the present invention will appear throughout the following specification and claims.

In the drawing:

Figure 1 is a front elevational view of the liquid measuring instrument;

Figure 2 is a side elevational view thereof;

Figure 3 is a horizontal sectional view taken on line 3—3 of Figure 2;

Figure 4 is a vertical sectional view taken on line 4—4 of Figure 3;

Figure 5 is a horizontal sectional view taken on line 5—5 of Figure 2;

Figure 6 is an enlarged side elevational view, partly broken away, of a modified form of light-transmitting element.

By referring to the drawing, it will be seen that 10 designates the base, preferably formed of an aluminum casting triangular in shape. An upstanding socket portion 11 is carried at the rear apex of the base 10, as shown. A standard 12 preferably square in cross section is locked within the socket portion 11 in any suitable manner. A scale plate 13 is carried to one side of the standard 12 by means of supporting brackets 14, which brackets 14 are provided with sockets 15 fitting around the standard 12 and anchored in position in any suitable manner, such for instance as by set-screws and the like. This scale plate 13 is provided with parallel vertically arranged scale columns 16, 17, 18 and 19 designated "Gallon," "½ Gal.," "¼ Gal.," and "Pint," respectively. Any other desired type of scale or designation may be employed without departing from the spirit of the invention.

A tubular light-containing housing 20 is supported in a vertical position upon a bracket arm 21, which bracket arm 21 is provided with a sleeve 22, the sleeve 22 being slidably mounted upon the standard 12. A set-screw 23 is carried by the sleeve 22 and engages the standard 12 for locking the sleeve 22, arm 21, and housing 20, in a selected set position on the standard 12. A light bulb 24 is suspended within the upper open end of the housing 20 by a suitable socket, as shown, and a cap 25, which cap 25 is preferably locked in position by means of a set-screw 26 carried by the housing 20. A cord 27 extends out through the cap 25 and through a guiding eye 28 upon the top of the standard 12 to suspend the cord in a convenient position and permit the housing to be easily moved up and down. A plug 29 is carried by the outer end of the cord 27, to facilitate the attachment of the device to the conventional electrical fixture or receptacle.

A light-transmitting element in the nature of a rod 30, preferably made of Lucite or other transparent plastic substance, is suspended within the hollow reduced collar 31 of the housing 20. A set-screw 32 holds this rod 30 in a set position and locks the rod 30 in place. The rod 30 is flat at its upper or inner end which extends flush with the inner face of the bottom of the housing 20, as shown at 30ª in Figure 4. The lower or outer end of the rod 30 tapers, as indicated at 33.

A reflecting indicator or hand 34 is carried by the bracket arm 21, and this indicator 34 is preferably made of lucite or similar plastic substance. The bracket arm 21 extends forwardly of the standard 12 to support the housing 20 in vertical alignment with the standard 12 so that the light-transmitting element or rod 30 may extend down into the can or receptacle 35 shown in dotted lines in Figure 2, and which receptacle is adapted to set upon the base 10 in front of the standard 12. The indicator 34 extends across the front of the scale plate 13 so as to transversely overlie the scale columns 16, 17, 18 and 19, as shown in Figure 1. The indicator 34 preferably tapers at its outer end 36 and is provided with a central longitudinal gauge line 37 which is adapted to register with a selected graduation on one of the scale columns on the plate 13, when moved to an overlying position. The line 37 is preferably red to distinguish from the scale markers which are preferably black. The indicator 34 is secured to the bracket arm 21 by means of a forwardly extending right-angular portion 38. The housing is provided with a light-opening 39 pointing toward the scale plate 13 and indicator 34, through which opening 39 light rays from the bulb 24 are directed toward the scale plate 13 and indicator 34 to facilitate the reading of the scale columns 16, 17, 18 and 19, and the position of the indicator 34.

It should be understood that the standard 12 is adjustably mounted within the socket portion 11 so that the standard extends down through the base 10 if desired, for the purpose of facilitating the leveling of the base 10, should the instrument be placed upon an even surface.

The present device is particularly adapted for measuring the depth of liquids of any type which may be placed in open containers such for instance as paint cans, glass jars, bottles, or the like, or any given or known capacity. The housing 20 may be adjusted vertically upon the standard 12 and the scale at a point adjacent the indicator 34 will be illuminated by light which is projected through the light opening 39 in the housing 20 at the same time the light from the bulb 24 will be projected down through or transmitted through the plastic rod 30. When the housing 20 has been set at a desired position and the indicator 34 has registered with the selected position upon one of the selected scale columns on the scale plate 13 and the rod 30 is extended into a container, suitable liquid such as lacquer, paint or the like is poured into the container. When the liquid rises to a point where the liquid contacts with the lower end of the rod 30, the light rays from the rod will automatically flicker or spread over the top of the liquid, thereby indicating to the operator that the desired measure or amount has been placed within the receptacle and that the desired measured amount is correct. By means of the present device the indicator may be very readily and conveniently adjusted and the parts are so mounted as to facilitate the moving of the rod 30 and its supporting housing 20 into and out of an operative position within a receptacle such as a can and the like.

In Figure 6, there is shown a modified form of the light-transmitting element which consists of a transparent rod 40 having a reduced lower terminal 41, the outer end of the terminal 41 being rounded, as at 42. A rounded shoulder 43 is formed with a rounded shoulder 44 at the junction of the rod 40 with the reduced terminal 41.

It should be understood that when it is desired to use a one-half gallon scale, it is not necessary to use a one-half gallon container. It is possible to use the gallon container with this scale and still have the same accuracy and have more than a half-gallon of paint, which in this particular instance would be about three quarts. In other words, the heighth governs the measurement, and not the circumference. It is not necessary to have a known capacity in order to get the correct shade in view of the fact that the shade may be determined by the position of the device and its vertical adjustment.

Through the medium of the present invention, it will be possible to conveniently and accurately mix paint, lacquer, and the like, in proper accurate proportions to obtain a proper or desired shade or density of color, and the like, and to permit of a duplication of such shade and color even though the mixture is made up at different times. In actual practice it has been found difficult to accurately measure-out the exact proportion of each constituent of an ultimate mixture with the result that the final product is frequently slightly off-shade, and therefore unsatisfactory to the customer, particularly if it be employed for repair purposes on automobile bodies, and other articles where imperfect match in color will be easily detected. By means of the present instrument the colors and shades may be accurately mixed and matched because of the accurate measurement of the constituents making-up the ultimate material.

In actual practice, the indicator 34 may be positioned in one position with respect to the column scale 19 and lacquer thinner added. The indicator may then be raised to a selected position on column scale 18 and #212 blue may be added. The indicator 34 may then be raised to a desired position on scale 17 and #201A white may be added. The indicator 34 may then be raised to a desired position on column scale 16 and #209 deep maroon added, and in this way obtaining the desired shade and color. By making a record of these positions, these steps may be repeated over and over to obtain the same ultimate product.

Certain detail changes in the mechanical construction may be employed without departing from the spirit of the invention, so long as such changes fall within the scope of the appended claims.

Having described the invention, what is claimed as new is:

1. A device for determining the heighth of the surface of the liquid in a container of known capacity, comprising a base adapted to support a container, a vertical standard mounted upon the base in offset relation with respect to a container adapted to be supported by the base, a scale supported upon the standard and laterally thereof, a light-containing housing slidably supported upon the standard forwardly and laterally of the scale, means for locking the light-supporting housing in a set position upon the standard, a transparent laterally extending indicator mounted for movement with the housing and overlying the scale, a depending light-transmitting element carried by the housing and adapted to extend into a receptacle for contact with liquid poured into the receptacle, the housing having an opening through which light rays are projected, said opening being located to direct light rays toward the indicator and scale, and the light-transmitting element being adapted to transmit rays to the surface of liquid within a container whereby light rays will automatically flicker and spread over the top of the liquid in the container when the liquid contacts with the lower end of said light-transmitting element.

2. A device for determining the heighth of the surface of liquid in a container of known capacity, comprising a vertical standard, a scale supported upon the standard, and extending laterally thereof, a light-supporting housing slidably mounted upon said standard and located forwardly of and laterally of said scale, illuminating means mounted within the housing, said housing having a light-directing means formed therein for throwing rays of light upon the scale, an indicator carried by the housing and movable over the scale, and a light-transmitting element depending from the housing and illuminated from the housing, the light-transmitting element being adapted to extend into a container for contact with liquid therein in a manner whereby light rays will automatically flicker and spread over the top of the liquid when the liquid contacts with the lower end of the light-transmitting element, and said indicator being adapted to indicate the position of the light-transmitting element and the heighth of the surface of liquid in the container.

3. A device for determining the heighth of the surface of liquid in a container of known capacity, comprising a vertical standard, a scale supported upon the standard and extending laterally thereof, a light-supporting housing slidably mounted upon said standard and located forwardly of and laterally of said scale, illuminating means mounted within the housing, said housing having a light-directing means formed therein for throwing rays of light upon the scale, an indicator carried by the housing and movable over the scale, a liquid-contacting means depending from said light-supporting housing and being adapted to extend into a container for contact with the surface of liquid within said container, and said indicator being adapted to indicate the position of the light-transmitting element and the heighth of the surface of liquid in the container.

LOUIS G. ZACHOS.